United States Patent [19]

Shuford

[11] Patent Number: 4,465,777

[45] Date of Patent: Aug. 14, 1984

[54] COMPOSITION AND METHOD FOR FORMING A PROTECTIVE COATING ON CARBON-CARBON SUBSTRATES

[75] Inventor: David M. Shuford, Grand Prairie, Tex.

[73] Assignee: Vought Corporation, Dallas, Tex.

[21] Appl. No.: 453,930

[22] Filed: Dec. 28, 1982

Related U.S. Application Data

[63] Continuation of Ser. No. 252,117, Apr. 8, 1981, abandoned.

[51] Int. Cl.$^3$ .............................................. C04B 35/56
[52] U.S. Cl. ..................................... 501/88; 501/154; 427/419.7; 428/408
[58] Field of Search ............... 501/88, 154; 427/419.7; 428/408

[56] References Cited

U.S. PATENT DOCUMENTS

| | | | |
|---|---|---|---|
| 3,853,566 | 12/1974 | Prochazka | 501/88 |
| 3,947,550 | 3/1976 | Fitchmun | 501/88 |
| 3,960,577 | 6/1976 | Prochazka | 501/88 |
| 4,080,415 | 3/1978 | Coppola et al. | 501/88 |
| 4,133,689 | 1/1979 | Stroke | 501/88 |
| 4,224,073 | 9/1980 | Sasaki et al. | 501/88 |

*Primary Examiner*—James Poer
*Attorney, Agent, or Firm*—Richards, Harris & Medlock

[57] ABSTRACT

In accordance with the invention, a composition of matter is provided for forming a coating for protecting carbonaceous substrates from degradation at elevated temperatures. The composition is a mixture of particulate silicon, silicon carbide and boron. The mixture contains between about 25% and 40% silicon by weight of the total composition, between about 50% and 70% by weight silicon carbide by weight of the total composition, between about 1% and 15% boron by weight of the total composition and a minor amount of magnesium oxide. The method is provided for forming a primary protective coating on carbonaceous substrates utilizing the aforesaid mixture. An enhancement coating is provided for sealing the primary coating in applications where the substrate will be subjected to elevated temperatures and temperature cycling.

39 Claims, No Drawings

COMPOSITION AND METHOD FOR FORMING A PROTECTIVE COATING ON CARBON-CARBON SUBSTRATES

This is a continuation of application Ser. No. 252,117 filed Apr. 8, 1981, now abandoned.

TECHNICAL FIELD

This invention relates to the protection of carbon and graphite materials from degradation at elevated temperatures. More particularly, the invention relates to the protection of reinforced carbon-carbon composite substrate materials, utilizing a composition of matter containing boron, silicon carbide and silicon for forming a protective coating that protects the substrate from degradation at elevated temperatures in oxygen containing environments.

BACKGROUND ART

Graphite and carbon materials, especially reinforced carbon-carbon composite substrate materials, are subject to many applications in modern industry, particularly in the aerospace and aviation fields. However, such materials, when unprotected, are subject to degradation at elevated temperatures. Since many applications involve high temperatures, resistance to high temperature and thermal shock are often required properties of the material.

Reinforced carbon-carbon composite substrates are generally constructed of fibers and bound by a carbon matrix, resulting in a material having excellent structural properties. Generally, carbonaceous fibers such as polyacrylonitrile, rayon or pitch-based fibers are utilized. Carbon-carbon impregnation materials generally are phenolic, furfuryl or pitch-based materials. However, the use of a specific substrate material is not a limitation upon the present invention.

Graphite and carbon materials, including reinforced carbon-carbon composites, are subject to degradation, such as oxidation, when utilized in high temperature environments in the presence of oxygen. Generally, an unprotected graphite or carbon material will begin to oxidize at temperatures in excess of about 650° F. in air. Therefore, in order to effectively utilize these materials in high temperature applications, it is necessary to provide protection from degradation, including oxidation. Accordingly, a need exists for a composition of matter and method for forming protective coatings on graphite and carbon materials, and especially for reinforced carbon-carbon composite materials.

One indication of high temperature degradation resistance is the percent weight change of the coated substrate or part that is exhibited over a period of exposure in an elevated temperature environment containing oxygen. It is desirable for a coated substrate not to exhibit a significant weight change after exposure to high temperatures in oxygen containing environments since this could affect the performance of the device incorporating such materials.

Accordingly, a need exists for a method and composition of matter for forming a protective coating on carbon substrates that provides resistance to degradation at elevated temperatures of up to about 3000° F. Further, a need exists for a method and composition of matter for forming a protective coating on reinforced carbon-carbon composite substrates wherein protection from degradation is provided at elevated temperatures where temperature cycling frequently occurs, thereby subjecting the substrate to varying temperatures between about 3000° F. and below 0° F.

DISCLOSURE OF THE INVENTION

In accordance with the present invention, a composition and method is provided for forming a primary protective coating on carbonaceous substrate materials. The primary coatings formed in accordance with the method and compositon of the present invention exhibit excellent protection from oxidation and degradation at temperatures between about 2500° F. and 3000° F. in oxygen containing environments.

Broadly stated, the composition for forming a primary protective coating on carbonaceous substrate materials comprises between about 25% and 40% particulate silicon by weight of the total composition, between about 50% and 70% particulate silicon carbide by weight of the total composition and between about 1% and 15% of particulate boron by weight of the total composition. The composition should also include a minor amount of magnesium oxide. Magnesium oxide is generally present as an impurity in technical grade particulate boron in sufficient quantity.

In accordance with the method of the present invention, a primary protective coating is formed on carbonaceous substrate materials for protecting the material from degradation at elevated temperatures that comprises forming an essentially uniform mixture of particulate silicon, silicon carbide and boron in the range of the aforesaid composition, together with a minor amount of magnesium oxide. The material that is to be coated is encased in a release agent that is a carbonaceous material, such as filter paper, that is preferably free of metallic impurities. The encased substrate is contacted with the aforesaid mixture. Thereafter, the encased substrate and mixture is heated and maintained between about 3175° F. and 3350° F. in an inert atmosphere for a period of time sufficient to form a coating of the desired thickness on the surface of the substrate from the mixture. The encased substrate is maintained in contact with the mixture during heating. Generally, the encased substrate and mixture will be heated for a period of between about 4 and 7 hours to form the primary coating that is usually between about 5 and 30 mils thick. The thickness of the primary coating obtained depends on several factors, including the timetemperature profile (TTP), the concentration of components and the type of substrate material.

The primary coating is useful for protecting the substrate material from degradation at temperatures between about 2500° F. and 3000° F. in air.

In applications where the coated substrate will be exposed to cyclic temperatures, in which temperatures lower than 2500° F. are also encountered, an enhancement coating is applied to the primary coating. The combination of the primary coating formed from the particulate silicon, silicon carbide and boron mixture with the enhancement coating results in a protective coating that provides protection from degradation at cyclic temperatures that range between about −300° F. and 3000° F.

In one embodiment, the enhancement coating is formed by impregnating the primary coating with tetraethyl orthosilicate. The tetraethyl orthosilicate is then heat cured on the primary coating forming a silica coating. Theraftor, a slurry of an alkali silicate liquid and silicon carbide powder is applied to the surface and heat cured. Alternatively, a mixture of water, sodium borate and sodium silicate can be substituted for the liquid alkali silicate.

In accordance with another embodiment of the enhancement coating, a monoaluminum phosphate solution containing alumina and silicon carbide is applied to the surface of the primary coating and is thereafter heat cured.

The enhancement coating has the effect of sealing the primary coating, thereby preventing direct exposure of the substrate to the atmosphere when temperature cycling occurs, which causes the primary coating to expand and to contract. A substrate having the primary coating and the enhancement coating can be subjected to temperature cycling in which temperature as high as about 3000° F. and as low as −300° F. are attained in oxygen containing environments without significant detrimental effects to the substrate.

DETAILED DESCRIPTION

In accordance with one aspect of the present invention, a composition is provided for forming a primary protective coating on carbon-carbon substrate materials. While the present invention is primarily concerned with protecting reinforced carbon-carbon composite substrates, the invention is also applicable to the formation of protective coatings on various types of graphite and carbon substrates. The term "carbonaceous substrate" for purposes of this invention includes all such materials.

The primary coating is useful for protecting carbonaceous substrates from degradation at sustained temperatures of between about 2500° F. and 3000° F. without additional protective coatings.

The compositions for forming the primary coating in accordance with the invention contain between about 25% and 40% particulate silicon by weight of the total composition, between about 50% and 70% particulate silicon carbide by weight of the total composition and between about 1% and 15% particulate boron by weight of the total composition. In a preferred embodiment, the composition comprises about 35% by weight silicon, about 60% by weight silicon carbide and about 5% by weight boron. Minor amounts of magnesium oxide should also be present. Generally, technical grade boron contains magnesium oxide as an impurity in a sufficient amount for purposes of the invention. Technical grade boron generally contains between about 8–10% by weight impurities, most of which is magensium oxide. The magnesium oxide facilitates formation of the primary coating on the substrate. Generally, between about 2–8% magnesium oxide is preferred and about 4% magnesium oxide by weight of the boron is most preferred in the composition for forming the primary coating. Preferably, particulate amorphous boron is utilized and one preferred type can be obtained from the Kerr McGee Company, a corporation of the state of Delaware, sold under the trade designation "Trona" which contains about 90% to 92% by weight of particulate boron with the remainder containing impurities of which magnesium oxide is the major impurity. While understanding the function of the magnesium oxide is not essential to practicing the invention, it is believed that the magnesium oxide present in the boron acts as a fluxing agent facilitating formation of the primary coating.

Preferably, the particle size of the three components are as follows: silicon-about 325 Tyler standard screen scale; boron-between about 0.5 and 20 microns; and silicon carbide-between about 4.5 and 20.5 microns.

The most preferred type of silicon carbide is sold under the trade designation "RA 1200, Class 1-green grit" by the Carborundum Company, a corporation of the state of Delaware.

In utilizing the composition in accordance with the present invention, the components are mixed together to form a uniform mixture. In order to form the primary protective coating, the mixture is brought into contact with a release agent that encases the substrate. The release agent is carbonaceous material that is preferably free of metallic impurities and encloses the substrate. The release agent may be, for example, ash free paper. Preferably, the release agent is a combination of ash free filter paper and filter paper pulp that is applied with a binder material, such as hydroxypropyl methyl cellulose. A preferred type of hydroxypropyl methyl cellulose is sold by the Dow Chemical Company of Midland, Mich. under the tradename "Methocel." The use of the filter paper in combination with filter paper pulp and binder solution allows the substrate to be easily encased by the release agent. The release agent facilitates removal of the substrate from the mixture after the primary coating has been formed. When a binder, such as hydroxypropyl methyl cellulose is utilized, the release agent is heated generally between about 200° F. and 400° F. to dry and cure the binder. After the release agent encloses the substrate, the mixture is brought into contact with the encased substrate. Generally, the entire substrate or part will be encased by the mixture resulting in a protective coating on the entire surface of the substrate.

Preferably, the encased substrate to be coated having the release agent thereon is placed in a graphite retort or other container that is capable of withstanding very high temperatures. The mixture is uniformly packed around the substrate so that the mixture completely encases the substrate. Most preferably, the compaction of the mixtures tested for surface compaction. It is preferred that the surfce compaction unconfined strength is between about 5.0 and 6.0 tons/ft$^2$, which can be measured on a soil tester sold by Soil Test Inc. of Chicago, Ill., Model No. CL 700, which is used with a probe of circular cross-section, one-half inch in diameter and is inserted to a depth of one-quarter inch into mixture.

As an alternative to packing the mixture for completely encasing the substrate with the mixture, a slurry of the composition and a carrier liquid can be utilized in which the slurry encases the substrate having the release agent thereon. Suitable carrier liquids include water, isopropyl alcohol and mixtures thereof, for example.

In packing the substrate in the composition it is advantageous to provide parting planes for facilitating removal of the substrate after the coating is formed, since the compositons tend to solidify into a hard mass after heating. Parting planes can be provided by dividing the volume of composition into separate quadrants, utilizing a carbonaceous material such as paper, preferably ash-free filter paper.

Generally, a weight is placed upon the unconfined surface of the mixture to help maintain contact between the mixture and the encased substrate, since the carbonaceous material that encases the substrate degrades upon heating.

After the compositon encases the substrate and release agent, the composition is dried under vacuum.

Thereafter, the graphite retort containing the mixture and substrate is placed in an inert atmosphere. Preferably, an argon gas atmosphere is utilized, at a pressure of about 3 psi (gauge). The graphite retort and its contents are then heated to form the coating. The furances used for heating to produce the protective coating generally have graphite resistance tubes as heating elements or use graphite receptors which are heated by induction. The retorts are then heated by radiation.

Generally, the retort and its contents are heated in the range of between about 3175° F. and 3350° F. for a period of time sufficient to form the protective coating of a desired thickness. It is generally preferred to first heat the retort and its contents to about 2800° F. to facilitate attainment of a desired temperature. Therafter, the retort and its contents are maintained at a temperature of about 3100° F. is maintained for about two hours. Then, the retort and its contents are heated so that a temperature of about 3300° F. is maintained for two hours. The retort and its contents are then cooled. Generally, cooling is accomplished by turning off power to the furnace. The foregoing described step-heating process is preferred because a more uniform coating results than if the retort and its contents were maintained at a fixed temperature. Generally, the four hour step-heating process as previously described produces a primary coating that is between about 5 and 10 mils thick.

In applications where the substrate will be exposed to temperatures up to about 3000° F. but lower than 2500° F., an enhancement coating is applied to the primary coating. The combination of the primary coating and the enhancement coating results in a protective coating on the substrate that is effective in protecting the substrate from degradation and oxidation at temperatures between about −300° F. and 3000° F.

In accordance with one embodiment of the enhancement coating, the primary coating is impregnated with tetraethyl orthosilicate. The tetraethyl orthosilicte is then heat cured on the primary coating thereby forming a silica coating. Thereafter, a mixture of an alkali silicate liquid and silicon carbide powder is applied to the surface and is then heat cured. Preferably, the tetraethyl orthosilicate is applied five times to the primary coating and heat cured after each application. Genrally, the tetraethyl orthosilicate is cured at between about 225° F. and 275° F. for between about 45 and 60 minutes after the tetraethyl orthosilicate solidifies, forming crystals.

Preferably, after the fifth impregnation the part is heated between about 225° F. and 275° F. for about two hours after crystallization of the tetraethyl orthosilicate. Then, the part is cooled and reheated to between about 375° F. and 425° F. for between about 2 and 2.5 hours. Finally, the substrate is maintained at between about 565° F. and 625° F. for between about 6 and 7 hours.

After the primary coating has been impregnated with the tetraethyl orthosilicate and cured, a slurry of an alkali silicate liquid and silicon carbide powder is applied to the surface and heat cured. Alternatively, a mixture of water, sodium borate and sodium silicate can be substituted for the liquid alkali silicate. Preferably, for 100 ml. of water, the mixture includes 10 gm of sodium borate and 100 ml. of a sodium silicate solution containing 39% soldis sold by Ridland's Mfg. Co. of Dallas, Tex. The slurry is applied to the surface using a brush, spatula or other type of applicator. Preferably, the area of the part that is being coated with the slurry is kept in a wet condition as the slurry is being applied. The excess slurry is wiped off using, for example, a cheesecloth material.

After application of the slurry to the part, it is dried and cured. Preferably, the drying procedure is accomplished under ambient conditions for a period of about sixteen hours. Therafter, the slurry is heat cured. Preferably, curing takes place by maintaining a temperature of between about 185° F. and 225° F. for at least about two hours, therafter increasing the temperature to between about 375° F. and 425° F. for at least about two hours and finally increasing the temperature to between about 575° F. and 625° F. for between about 4 and 7 hours.

In accordance with a preferred embodiment of the enhancement coating, the slurry contains about 50 parts by weight of an alkali silicate liquid, most preferably the alkali silicate liquid sold under the tradename "Sermabond 487" by the Sermetel Corporation of Limerick, Pa. and about 50 parts by weight of a powder mixture containing equal amounts of black silicon carbide powder sold under the trade designation "RA 1200-black grit" by the Carborundum Company and graphite felt that has been converted to powdered silicon carbide felt. Preferably, the graphite felt utilized is "grade WDF" from the Union Carbide Company, Carbide Products Division of New York, N.Y. The graphite felt can be converted to silicon carbide felt by packing the felt in a mixture containing between about 30% and 60% by weight silicon carbide, between about 30% and 50% by weight silicon and between about 10% and 20% by weight alumina. Preferably, the packed graphite felt is heated between about 2950° F. and 3050° F. for about 5–6 hours. After the graphite felt has been converted to silicon carbide felt, the felt is powdered by an suitable method, such as a ball mill. The powdered silicon carbide converted felt should have a small random fiber size. Preferably the fibers will have a diameter of about 8 microns and will be of varied length, ranging between about several microns and about 0.01 inches.

In accordance with an alternate emobidment of the enhancement coating, a monoaluminum phosphate solution containing particulate alumina and silicon carbide is applied to the surface of the primary coating and is thereafter heat cured. Preferably, the liquid portion of the slurry contains about 55% by weight monoaluminum phosphate and about 45% by weight distilled water. The powder components of the slurry are preferably about 31.2% particulate silicon carbide by total weight of the powder components, prefrably silicon carbide sold under the trade designation "RA 1200-black grit" by the Carborundum Company, about 31.3% of particulate silicon carbide converted felt by total weight of the powder components, about 32.8% particulate alumina by weight of the powder components, sold under the trade designation "T-61", and about 4.7% by weight particulate alumina sold under the trade designation "C-333", both from the Alcoa Corporation of Pittsburgh, Pa. The liquid and particulate components are combined in a ratio that is preferably about 1:1. The slurry can be applied using either a brush, spatula or other suitable instrument. The excess slurry is wiped off from the surface, preferably with a dry cheesecloth. The slurry applied to the surface is then heat cured. Preferably, after the slurry has been applied to the primary coating, it is dried at ambient temperature for about 16 hours. Thereafter the slurry is cured by being maintained at about 200° F. for about two hours, then at about 400° F. for about two hours and finally at about 600° F. for about four hours. The curing is accomplished in an air oven and no special atmospheric requirements are necessary.

While the invention has been described with respect to preferred embodiments, it will be understood that the invention is capable of numerous rearrangements, modifications and alterations, and such rearrangements, modifications and alterations are intended to be within the scope of the appended claims.

For some types of substrates, it may be advantageous to pretreat the substrate prior to formation of the primary coating. In some cases, the primary coating is formed on the substrate more uniformly when the substrate is pretreated. Three types of pretreament have been utilized. In accordance with one type of pretreatment, the substrate is impregnated with tetraethyl orthosilicte and cured. Preferably, the tetraethyl orthosilicate is applied five times in between each application curing is accomplished by heating between about 225° F. and 275° F. for about thirty minutes after crystallization of the tetraethyl orthosilicate occurs. After the fifth impregnation, the substrate has any excess material removed therefrom and is then heat treated by heating at about 400° F. for about two hours and about 600° F. for four hours.

The second type of pretreatment is heat treatment. Generally, the substrate is heated in an inert atomsphere, preferably argon, at a temperature of about 3250° F. for about one hour.

The third type of pretreatment is a combination of heat treatment followed by treatment with tetraethyl orthosilicate, which can be accomplished as previously described.

Various advantages of the invention are apparent from the following examples:

EXAMPLE 1

A reinforced carbon-carbon composite substrate is coated in accordance with the present invention. The substrate was pretreated by impregnating five times with tetraethyl orthosilicate and curing after each time has set forth in the description of the preferred tetraethyl orthosilicate pretreatment. The primary coating was formed by utilizing a mixture of 35% silicon, 60% silicon carbide and 5% boron (by weight). Amorphous boron from the Kerr McGee Company having the tradename "Trona" was utilized. Silicon carbide having the trade designation "RA 1200-Green Grit" from the Carborundum Company was utilized and silicon having a particle size of about 325 Tyler standard screen scale was utilized.

The substrate was coated with a release agent comprising ash free filter paper and filter paper pulp mixed with "Methocel," a hydroxypropyl methyl cellulose from Dow Chemical Company. After the release agent was dried, the substrate was packed its mixture at the preferred amount of surface compaction.

After packing, the composition was dried under vacuum and the graphite retort containing the mixture and substrate was placed in the heating furnace and an Argon gas atmosphere. The retort was then heated to 2800° F. and thereafter heated at 3100° F. for two hours and finally at 3300° F. for two hours.

After the part was cooled and cleaned, an enhancement coating was applied to the primary coating. In forming the enhancement coating, the primary coating was impregnated five times with tetraethyl orthosilicate. The tetraethyl orthosilicate was heat cured after each application at between about 225° F. and 275° F. for between about 45 and 60 minutes after the tetraethyl orthosilicate solidified. After the fifth impregnation, the substrate was heated for about two hours at between about 225° F. and 275° F. after crystallization of the fifth application of the tetraethyl orthosilicate. The substrate was then cooled and reheated to about 400° F. for two hours and finally heated for four hours at about 600° F.

After the tetraethyl orthosilicate impregnation and curing, a slurry of an alkali silicate liquid ("Sermabond 487") and silicon carbide powder in a ratio of 1:1 was applied to the surface and heat cured. The silicon carbide was a 50:50 mixture of "RA 1200-black grit" silicon carbide from the Carborundum Company and graphite felt that had been converted to powder silicon carbide felt. "Grade WDF" graphite felt from Union Carbide was converted to silicon carbide felt by packing the felt in a mixture of silicon carbide, silicon and alumina and applying heat. After conversion, the felt was powdered to a small random fiber size.

After application of the coatings, the substrate was tested by subjecting it to air at 1000° F. for thirty hours. The substrate exhibited a net mass change of $-0.0086$ kg/m$^2$ of substrate surface area.

EXAMPLE 2

A substrate was coated as set forth in Example 1 and then tested by subjecting the substrate to air at 2450° F. for thirty hours. The substrate exhibited a net mass change of $+0.017$ kg/m$^2$ of substrate surface area. Substantially all of the mass change occurred in the first three hours of exposure.

While the invention has been described with respect to preferred embodiments, it will be understood that the invention is capable of numerous rearrangements, modifications and alterations and such rearrangements, modifications and alterations are intended to be within the scope of the appended claims.

I claim:

1. A composition for forming a coating for protecting a carbonaceous substrate from degradation at elevated temperatures comprising a mixture of:
   (a) between about 25% and 40% particulate silicon by weight of the total composition;
   (b) between about 50% and 70% particulate silicon carbide by weight of the total composition;
   (c) between about 1% and 15% of particulate boron by weight of the total composition; and
   (d) a minor amount of particulate magnesium oxide for facilitating formation of the coating.

2. The composition of matter as recited in claim 1 wherein:
   (a) silicon carbide is present in an amount of about 60 % by weight of the total composition;
   (b) silicon is present in an amount of about 35% by weight of the total compositon; and
   (c) boron is present in an amount of about 5% by weight of the total composition.

3. The composition of matter as recited in claims 1 or 2 wherein the magnesium oxide is an impurity present in the boron.

4. A method for forming a coating on a carbonaceous substrate for protecting the substrate from degradation at elevated temperatures comprising:
   (a) forming a composition of an essentially uniform mixture of particulate silicon present in an amount of between about 25% and 40% by weight of the total composition, particulate silicon carbide present in an amount of between about 50% and 70% by weight of the total composition, particulate boron present in an amount of between about 1% and 15% by weight of the total composition and a minor amount of magnesium oxide;

(b) encasing the substrate to be coated with a release agent;

(c) contacting the encased substrate with said mixture; and (d) thereafter sufficiently heating said mixture and the carbon-carbon substrate encased by release agent to form the coating on the surface of the substrate from said mixture.

5. The method as recited in claim 4 wherein said mixture and the substrate encased with said release agent are maintained in the temperature range of between about 3075° F. and 3350° F.

6. The method as recited in claim 5 wherein said temperature is maintained in said temperature range for a period of about four hours.

7. The method as recited in claim 4 wherein said mixture contains about 60% by weight silicon carbide, about 35% by weight silicon and about 5% by weight boron, said boron containing said minor amount of magnesium oxide.

8. The method as recited in claim 4 wherein said mixture and the substrate encased by said release agent is heated to a temperature of about 2800° F., thereafter maintaining the mixture and substrate at a temperature of about 3100° F. for about two hours and thereafter maintaining the mixture and substrate at a temperature of about 3300° F. for about two hours.

9. The method as recited in claim 4 wherein said release agent comprises ash-free paper.

10. The method as recited in claim 4 wherein said release agent further comprises a hydroxypropyl methyl cellulose solution containing filter paper pulp.

11. The method as recited in claim 10 wherein said release agent is dried and cured prior to contacting with said mixture.

12. The method as recited in claim 4 wherein said mixture and the encased substrate is contained within a graphite retort during heating of said mixture and the encased substrate.

13. The method as recited in claim 4 further comprising forming an enhancement coating after formation of said primary coating for sealing the primary coating.

14. The method as recited in claim 13 wherein the method for forming said enhancement coating comprises:

(a) impregnating the primary coating with tetraethyl orthosilicate;

(b) heat curing the tetraethyl orthosilicate applied to said primary coating;

(c) thereafter applying a mixture of a liquid alkali silicate and particulate silicon carbide to the primary coating; and (d) curing the alkali silicate and silicon carbide mixture applied to the primary coating.

15. The method as recited in claim 14 wherein said tetraethyl orthosilicate is cured by heating between about 225° F. and 625° F. and said alkali silicate and silicon carbide mixtures are cured by heating up to about 625° F.

16. The method as recited in claim 13 wherein the method for forming said enhancement coating comprises:

(a) applying a mixture of an aqueous monoaluminum phosphate solution containing particulate alumina and silicon carbide to the surface of the primary coating; and (b) heat curing the aqueous monoaluminum phosphate solution containing particulate alumina and silicon carbide applied to the primary coating.

17. The method as recited in claim 16 wherein the aqueous monoaluminum phoshate solution containing silicon carbide and alumina is allowed to dry at ambient temperature and is thereafter heat cured by maintaining at a temperature of about 200° F. for about two hours, then at about 400° F. for about two hours and finally at about 600° F. for about four hours.

18. The method as recited in claim 13 wherein the method for forming said enhancemnt coating comprises:

(a) impregnating the primary coating with tetraethyl orthosilicate;

(b) heat curing the tetraethyl orthosilicate applied to the primary coating;

(c) hereafter applying a mixture of an aqueous sodium borate sodium silicate solution and particulate silicate carbide to the primary coating; and (d) curing the mixture of the aqueous sodium borate-sodium silicate and particulate silicon carbide applied to the primary coating.

19. The composition of matter as recited in claim 3 wherein said magnesium oxide is present in an amount of from about 2 to about 8% based on the weight of boron.

20. The composition of claim 19 wherein said magnesium oxide is present in an amount of about 4% by weight of said boron.

21. The composition of claims 1 or 2 wherein said particulate silicon has a particle size of about 325 Tyler standard screen scale.

22. The composition of claims 1 or 2 wherein said particulate silicon carbide has a particle size of between about 4.5 and about 20.5 microns.

23. The composition of claims 1 or 2 wherein said boron has a particle size of between about 0.5 and about 20 microns.

24. A composition for forming a coating for protecting a carbonaceous substrate from degradation by oxidation comprising a mixture of:

(a) between about 25 and 40% by weight of the total composition of particulate silicon having a particle size of about 325 Tyler standard screen scale;

(b) between about 50 and 70% particulate silicon carbide by weight of the total composition, said particulate silicon carbide having a particle size of between about 4.5 and 20.5 microns;

(c) between about 1% and 15% of particulate boron by weight of the total composition, said particulate boron having a particle size of between about 0.5 and about 20 microns; and (d) a minor amount of particulate magnesium oxide for facilitating formation of the coating.

25. The composition of matter as recited in claim 24 wherein:

(a) said silicon carbide is present in an amount of about 60% by weight of the total composition;

(b) said silicon is present in an amount of about 35% by weight of the total composition; and (c) said boron is present in an amount of about 5% by weight of the total composition.

26. The compositions as recited in claims 24 or 25 wherein the magnesium oxide is an impurity present in the boron in an amount of from about 2 to about 8% by weight of the boron.

27. A composition of matter as recited in claim 26 wherein the magnesium oxide is present in an amount of about 4% by weight of said boron.

28. A coated substrate resistant to degradation due to exposure to oxygen at elevated temperatures comprising:
   (a) a carbonaceous substrate; and
   (b) a coating on said substrate and comprising between about 25 and 40% by weight particulate silicon, between about 50 and 70% by weight particulate silicon carbide, between about 1 and 15% by weight of particulate boron and a minor amount of particulate magnesium oxide for facilitating formation of the coating, said percentages being based on the weight of the coating.

29. The coated substrate of claim 28 wherein said coating comprises about 60% by weight silicon carbide, about 35% by weight silicon and about 5% by weight boron.

30. The coated substrate of claims 28 or 29 wherein the magnesium oxide is an impurity present in the boron.

31. The coated substrate of claim 30 wherein said magnesium oxide is present in an amount of from about 2 to about 8% by weight of the boron in said coating.

32. The coated substrate of claim 31 wherein said magnesium oxide is present in an amount of about 4% by weight of said boron.

33. The coated substrate of claim 28 and further comprising an enhancement coating formed from impregnating the coating with tetraethyl orthosilicate.

34. The coated substrate of claim 28 and further comprising an enhancement coating formed from a mixture of an aqueous monoaluminum phosphate solution containing particulate alumina and silicon carbide.

35. A method for protecting a carbonaceous substrate from degradation by oxidation at elevated temperatures comprising forming a coating on said substrate, said coating comprising a mixture of:
   (a) between about 25 and 40% particulate silicon by weight of the total composition;
   (b) between about 50 and 70% particulate silicon carbide by weight of the total composition;
   (c) between about 1 and 15% of particulate boron by weight of the total composition; and
   (d) a minor amount of particulate magnesium oxide for facilitating formation of the coating.

36. A method for protecting a carbonaceous substrate from degradation due to exposure to cyclical temperatures comprising forming on said substrate a coating comprising:
   (a) between about 25 and 40% particulate silicon by weight of the total composition;
   (b) between about 50 and 70% particulate silicon carbide by weight of the total composition;
   (c) between about 1 and 15% of particulate boron by weight of the total composition; and
   (d) a minor amount of particulate magnesium oxide for facilitating formation of the coating.

37. A composition comprising:
   (a) between about 25 and 40% silicon by weight of the total composition;
   (b) between about 50 and 70% silicon carbide by weight of the total composition;
   (c) between about 1 and 15% boron by weight of the total composition; and
   (d) from about 2 to about 8% magnesium oxide based on the weight of said boron.

38. The composition of claim 37 wherein said magnesium oxide is present as an impurity in the boron.

39. The composition of claim 39 wherein the magnesium oxide present as an impurity in the boron is present in an amount of from about 2 to about 8% by weight of the boron.

* * * * *